United States Patent [19]

Knott

[11] Patent Number: 5,371,161
[45] Date of Patent: Dec. 6, 1994

[54] METHOD FOR THE PREPARATION OF ORGANOPOLYSILOXANES CONTAINING SiH GROUPS

[75] Inventor: Wilfried Knott, Essen, Germany
[73] Assignee: Th. Goldschmidt AG, Essen, Germany
[21] Appl. No.: 154,650
[22] Filed: Nov. 18, 1993

[30] Foreign Application Priority Data

Nov. 21, 1992 [DE] Germany ............... 4239246

[51] Int. Cl.$^5$ ............................................. C08G 79/00
[52] U.S. Cl. .......................................... 528/9; 528/33
[58] Field of Search ................................... 528/9, 33

[56] References Cited

U.S. PATENT DOCUMENTS

| | | |
|---|---|---|
| 3,099,672 | 7/1963 | Cooper . |
| 3,535,092 | 10/1970 | Chalk . |
| 4,816,541 | 3/1989 | Koerner et al. ............ 528/10 |
| 5,198,207 | 3/1993 | Knott et al. ............ 423/647 |

FOREIGN PATENT DOCUMENTS

| | | |
|---|---|---|
| 0476597 | 3/1992 | European Pat. Off. . |
| 1028575 | 4/1958 | Germany . |
| 1085875 | 7/1960 | Germany . |
| 1568255 | 3/1970 | Germany . |
| 3637273 | 4/1988 | Germany . |
| 4039278 | 6/1992 | Germany . |

OTHER PUBLICATIONS

Jezy Chrusciel, Reduction of Dichloropoly (Dimethylsiloxanes) . . . 4 pages, 1979.
Walter Noll, Chemie und Technologie Der Silicone, 2 pages, 1968.
Notizen, Über die spaltung der Si–O–Bindung mit . . . ., 2 pages, Jun. 6, 1955.

*Primary Examiner*—Melvyn I. Marquis
*Assistant Examiner*—Helen F. Lee
*Attorney, Agent, or Firm*—Anderson Kill Olick & Oshinsky

[57] ABSTRACT

A method for the preparation of organopolysiloxanes containing SiH groups from the appropriate organopolysiloxanes containing silicon halide groups by reaction with metal hydrides, wherein, as metal hydride, a compound of the general formula $$[Mg_2X_3(Ether)_y]^+[AlH_{4-n}X_n]^-$$

is used, and the reaction is carried out in this ether as solvent within a temperature range from 0° to 20° C. The method proceeds selectively with retention of any alkenyl groups present.

2 Claims, No Drawings

METHOD FOR THE PREPARATION OF ORGANOPOLYSILOXANES CONTAINING SIH GROUPS

FIELD OF INVENTION

The invention relates to a method for the preparation of organopolysiloxanes containing SiH groups from the appropriate organopolysiloxanes containing silicon halide groups by reacting with metal hydrides.

BACKGROUND INFORMATION AND PRIOR ART

There are various uses for organopolysiloxanes containing SiH groups as starting materials in silicone chemistry. It is therefore of particular interest to be able to synthesize these compounds economically, in the simplest way possible and in high yields from easily accessible starting materials. As starting materials, particularly the easily accessible, appropriate organopolysiloxanes containing silicon halide groups come into consideration. The conversion of chlorosiloxanes into the corresponding hydrogensiloxanes and similar reactions with chlorosilanes are known from the literature.

For example, a method is disclosed in U.S. Pat. No. 3,099,672 for reacting halogensilanes or alkoxysilanes with sodium hydride at a temperature of 175° to 350° C. For this method, which can be employed only with silanes and not with organopolysiloxanes, a hydrogen atom takes the place of the halogen or alkoxy group, and the yields from this reaction vary.

Pursuant to the U.S. Pat. No. 3,099,672, the sodium hydride is used as such, as a suspension in mineral oil or other high-boiling, inert hydrocarbons or in the form of a coating on sodium chloride particles. The need to use relatively high temperatures makes the method more expensive and frequently leads to unwanted by-products.

The U.S. Pat. No. 3,535,092 discloses a method for converting compounds, which have silicon halide groups, with sodium hydride. Said method proceeds readily at room temperatures or only moderately elevated temperatures. This is made possible through the use of special solvents, such as hexaalkylphosphoramides, octaalkylpyrophosphoramides and tetraalkylurea. The alkyl groups in the solvent contain 1 to 4 carbon atoms. It can be inferred from the U.S. Pat. No. 3,535,092 that these solvents are to have a catalytic effect. The method can be used with halogensilanes as well as with halogensiloxanes. Alkoxysilanes do not react under the same conditions. Since the solvents have high boiling points, the products, which contain SiH groups, are distilled from the reaction mixture. By these means, the usefulness of this method is restricted to those silanes or siloxanes containing SiH groups, which can be distilled off at a justifiable cost and without thermal decomposition. Removal of the aforementioned solvents by washing is not possible without further ado. When the solvent is removed with water, sodium hydroxide is formed from the excess sodium hydride and leads to the formation of SiOSi bonds, hydrogen being split off in the process. However, since the solvents named in this patent are physiologically questionable, a complete separation of the silicon-containing products from the solvents is a necessary prerequisite for most applications.

Instead of the sodium hydride, complex hydrides, such as sodium aluminum hydride, have also already been used for exchanging silicon halide groups for silicon hydride groups. For example, the German Auslegeschrift 10 85 875 discloses a method for the preparation of polysiloxane hydrides of the general formula

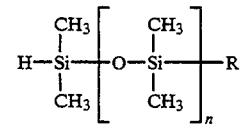

wherein n is a whole number, particularly from 1 to 5 and R represents hydrogen or alkyl and aryl groups, which is characterized in that polysiloxanes of the general formula

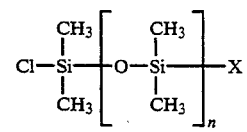

in which X represents chlorine or alkyl and aryl groups and n has the meaning given above, are reacted with lithium aluminum hydride. According to the examples of the German Auslegeschrift 10 85 875, 1,7-dichlorooctamethyltetrasiloxane is converted with lithium aluminum hydride in tetrahydrofuran in a 74% yield into 1,7-dihydrooctamethyltetrasiloxane. The conversion of 1-chloropentamethyldisiloxane into 1-hydropentamethyldisiloxane with lithium aluminum hydride takes place in a 57% yield.

As is evident from the "Polish Journal of Chemistry", 53, (1979), 1383–1386, by repeating the method of the German Auslegeschrift 10 85 875, SiOSi bonds are split in competition with the exchange of the silicon halide groups, so that silanes, such as the gaseous and easily ignitable dimethylsilane, are formed in considerable amounts as by-products. This is in agreement with the information in "Chemie und Technologie der Silicone" by W. Noll, Verlag Chemie, 1968, page 206, where it is stated that, due to the action of lithium aluminum hydride in ether on linear polydimethysiloxanes, siloxane bonds are converted into aluminosiloxane bonds and, at the same time, silanes are split off. In the case of silicate esters, the splitting reaction proceeds practically quantitatively. This splitting of SiOSi bonds by the action of lithium aluminum hydride can also be inferred from the Zeitschrift fuer Naturforschung, 10b, (1955), 423 to 424.

The German Auslegeschrift 15 68 255 discloses a similar method, in which trisodium aluminum hexahydride is used as complex aluminum hydride. The splitting of SiOSi groups is a competing reaction also when this complex hydride is used.

The German Auslegeschrift 10 28 575 starts out from the assumption that the hydrogenation with LiH is very much slower than that with LiAlH$_4$. One would have to work with a large excess of LiH in order to have bearable yields. Large amounts of solvents (72.5 kg of ether for 1 kg of SiH$_4$) are required for working with LiAlH$_4$. Said Auslegeschrift teaches instead that the reaction with hydrogen can be carried out in the presence of sodium or sodium hydride under pressure and at an elevated temperature. As shown by the Examples, the yields are of the order of 80 to 90%. However, when sodium is used, the Wurtz reaction (—Si—Cl+2 Na+

Cl—Si— → —Si—Si—), which is to be avoided, occurs as a side reaction, particularly at the given high temperatures.

From the German patent 36 37 273, a method is known for preparing organopolysiloxanes containing SiH groups. For this method, halogensiloxanes are reacted with LiH, NaH, KH, CaH$_2$ or MgH$_2$, using ether as reaction medium and with continuous removal of the metal halide deposited on the surface of the metal hydride particles during the reaction by the action of mechanical energy or ultrasound so as to form a fresh surface. From the point of view of good value, the safety and the reducing power, MgH$_2$, in particular, is utilized since the alkali hydrides are expensive and hazardous to handle, whereas the reducing power of CaH$_2$ is too low. During the reaction with MgH$_2$, however, which is to be preferred, easily inflammable portions of dimethylsilane are formed in a side reaction. On the one hand, said dimethylsilane reduces the SiH yield of the process. On the other, it leads indirectly to a change in the original chain distribution, particularly if the equilibration of the chlorosilane has been carried out with FeCl$_3$.

The European patent 0 476 597 teaches the preparation of 1,1,3,3-tetramethyl-1,3-disiloxane by reducing 1,1,3,3-tetramethyl-1,3-dichloro-1,3-disiloxane with a metal hydride, such as LiAlH$_4$, NaAlH$_4$, LiBH$_4$, LiH or NaH in an organic solvent under a blanket of an inert gas at temperatures of 0° to 50° C. LiH and NaH, which are not complex hydrides, do not give acceptable yields without grinding. On the other hand, the complex hydrides, LiAlH$_4$, NaAlH$_4$ and LiBH$_4$ are very expensive and, in the case of LiAlH$_4$ and NaAlH$_4$, dangerous to handle.

OBJECT OF THE INVENTION

An object of the invention is a method to convert chloropolysiloxanes into hydrogensiloxanes, said method can be carried out inexpensively at low temperatures. The reaction medium used is as physiologically safe as possible. The reducing agent utilized is highly effective and selective, without being pyrophoric and does not split SiOSi bonds at all or in appreciable amounts. The method is applicable for organopolysiloxanes with silicon halide groups, which have any molecular weight and, in particular, can have a high molecular weight. Preferably, it shall be possible to carry out. The method with α, ω-halogen organopolysiloxanes and particularly with those organopolysiloxanes, which, because of their high molecular weight, cannot be distilled and are obtained in this form by known industrial methods.

SUMMARY OF THE INVENTION

These requirements are fulfilled by the inventive method, the characteristics of which consist therein that, as metal hydride, a compound of the general formula $$[Mg_2X_3(Ether)_y]^+[AlH_{4-n}X_n]^- \quad I$$

is used, wherein
X is chlorine, bromine or iodine,
y is a number from 0 to 6, and
n is a number from 1 to 3,
Ether is an aliphatic or cycloaliphatic ether with 2 to 30 carbon atoms, with the exception of t-butyl ether, with a dipole moment of more than 0.5 Debye and a melting point of less than 0° C.,
and the reaction is carried out in this ether as solvent within a temperature range from 0° to 20° C.

A preferred inventive method is characterized in that tetrahydrofuran, diethyl ether, dimethoxyethane (glyme), di-n-butyl ether or 1,3-dioxolan is used as ether.

The conversion of the silicon halide groups into SiH groups by the inventive method takes place with a yield of 80 to 90%, based on the hydrogen available in the hydrides of formula I. At the same time, n preferably has a value of 1.

The inventive method exhibits a high degree of selectivity. While the conversion of the SiCl groups; into SiH takes place almost quantitatively, any alkenyl groups present in the molecule, such as vinyl groups, are not hydrogenated, but are retained. Accordingly, it is possible to convert, for example, 1,3-divinyl-1,3-dimethyl-1,3-dichlorodisiloxane into the corresponding 1,3,-divinyl-1,3-dimethyl-1,3-dihydrogendisiloxane.

The metal hydrides of Formula I, used in the inventive method, are prepared according to a method, which is described in the German Offenlegungsschrift (Patent Application P 42 35 334.5). For this method, aluminum halide AlX$_3$ is reacted with magnesium hydride MgH$_2$ with constant grinding in an organic solvent. Preferably, MgH$_2$, which has been prepared from the elements, is used for the reaction. Before the start of the reaction, magnesium hydride with a particle size not greater than 400 μm is added in an amount of at least 1.2% by weight, based on the magnesium to be hydrogenated, as catalyst to the magnesium to be hydrogenated. The hydrogenation is carried out at a temperature of not less than 250° C. and at a pressure of 0.5 to 5 MPa with constant stirring of the reactants. This autocatalytic method for preparing highly effective MgH$_2$ is the object of the German Offenlegungsschrift 40 39 278.

The inventive method is described in greater detail by the following examples, it being understood that these examples are given by way of illustration and not by way of limitation.

EXAMPLE 1

A THF solution (91.2 g, 61.6 mmoles of H) of a chlorine/magnesium/aluminum hydridochloride solution (n=1) is added to a round bottom flask and cooled with ice. An FeCl$_3$-equilibrated α, ω-dichloropolydimethylsiloxane is added at such slow rate with stirring that the reaction temperature does not exceed 10° C. At the end of the addition, stirring is continued for 2 hours at room temperature. The reaction mixture is then poured speedily into HCl/ice water. At the end of the hydrolysis, the siloxane-containing phase separates from the water phase. By repeated extraction with small portions of water, the siloxane is washed until it is free of THF. It is then dried over sodium sulfate and filtered. The yield is 14.6 g (83% of the theoretical yield.)

The reaction product has a hydrogen content of 0.27% (79% of the theoretical amount). The data from $^1$H-NMR analysis is as follows:

| δ (ppm) | Measurement in CDCl$_3$ |
|---|---|
| 0.05 | singlet, 43.2 H |
| 0.20 | doublet, 12 H |
| 4.70 | heptet, 2 H |

In addition, gas chromatography confirms that the original chain distribution of the α, ω-dichloropolydimethlsiloxane is largely retained.

EXAMPLE 2

α, ω-Dichloropolydimethylsiloxane (5.44 g, 15.5 mmoles) with 4 dimethylsiloxy groups is reacted as in Example 1 with 84.4 g (51.2 mmoles H) of chlorine/-magnesium/aluminum hydridochloride (n=1) dissolved in THF and subsequently is worked up hydrolytically. The crude siloxane phase is extracted twice with a little water and, after phase separation, dried over Na$_2$SO$_4$.

The hydrogen value is 0.64% (89% of the theoretical amount). The reaction product was characterized by $^{29}$Si-NMR analysis (measurement in CDCl$_3$):

| δ (ppm) | Rel. Integral | Assigned To |
|---|---|---|
| −7 | 1.75 | —(CH$_3$)$_2$SiH |
| −13 | 0.25 | —(CH$_3$)$_2$SiOC$_4$H$_9$ |
| −19 −22 | 2.00 | —(CH$_3$)$_2$SiO— |

According to the results of the $^{29}$Si-NMR analysis, 88% of the SiCl groups have been converted into SiH groups.

EXAMPLE 3

1,3-Divinyl-1,3-dimethyl-1,3-dichlorodisiloxane (20.0 g, 88.1 mmoles) is added dropwise at room temperature with stirring to 215.5 g (219.8 mmoles H) of chlorine/-magnesium/aluminum hydridochloride dissolved in THF, salt being precipitated. At the end of the addition, stirring of the reaction mixture is continued for 3 hours at 50° C. After it has cooled, the reaction mixture is speedily poured into ice-cooled ammonium chloride solution.

Phase separation and repeated extraction with small portions of water result in a crude product, which is dried over sodium sulfate and then filtered. The yield is 11.1 g (80% of the theoretical yield).

The product has a hydrogen content of 1.07%, which corresponds to 84% of the theoretical amount. The $^1$H-NMR analysis data is as follows:

| δ (ppm) | Measurement in CDCl$_3$ |
|---|---|
| 0.25 | multiplet, 6 H |
| 4.75 | multiplet, 1.6 H |
| 6.05 | multiplet, 5.6 H |

In addition, $^{29}$Si-NMR spectroscopy reveals a signal at δ=−13.8 ppm for 1,3-divinyl-1,3-dimethyl-1,3-dihydrogensiloxane. Spectroscopic analyses show, without doubt, that the vinyl function has been maintained while, at the same time, the SiCl groups have been converted into SiH groups.

I claim:

1. A method for the preparation of organopolysiloxanes containing SiH groups from the corresponding organopolysiloxanes containing silicon halide groups by reaction with metal hydrides, comprising reacting the organopolysiloxane containing silicon halide group with a metal hydride having a general formula

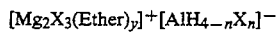

wherein
  is chlorine, bromine or iodine,
  is a number from 0 to 6,
  is a number from 1 to 3, and
  Ether is an aliphatic or cycloaliphatic ether with 2 to 30 carbon atoms, with the exception of t-butyl ether, with a dipole moment of more than 0.5 Debye and a melting point of less than 0° C., and carrying the reaction in said ether as solvent within a temperature range from 0° to 20° C.

2. The method of claim 1, further comprising that tetrahydrofuran, diethyl ether, dimethoxyethane (glyme), di-n-butyl ether or 1,3-dioxolane is used as ether.

* * * * *